United States Patent [19]

Andrews et al.

[11] 4,038,116

[45] July 26, 1977

[54] METHOD FOR DEGRADING AROMATIC EXPLOSIVE SOLUTIONS

[75] Inventors: Catherine C. Andrews, Bedford; Robert E. Klausmeier, Bloomington; Jerald L. Osmon, Bloomfield, all of Ind.

[73] Assignee: The United States of America as represented by the Secretary of the Navy, Washington, D.C.

[21] Appl. No.: 704,147

[22] Filed: July 12, 1976

[51] Int. Cl.² .............................................. C06B 25/04
[52] U.S. Cl. .................................. 149/105; 149/108.8
[58] Field of Search .............................. 149/105, 108.8

[56] References Cited

U.S. PATENT DOCUMENTS 3,310,946  3/1967  Dobbins ........................... 149/110 X Primary Examiner—Stephen J. Lechert, Jr.
Attorney, Agent, or Firm—R. S. Sciascia; Paul S. Collignon

[57] ABSTRACT

A method for treating an aqueous solution of aromatic explosives whereby explosive molecules are destroyed and the resulting effluent is safe for disposal. An additive, such as acetone or hydrogen peroxide, is added to an aqueous solution of aromatic explosives and this mixture is exposed to ultraviolet light. The light exposure of the additive provides a free radical which strips hydrogen molecules from the aromatic explosives to change the aromatic explosive to an unstable intermediate compound. Continued exposure of this unstable intermediate compound to ultraviolet light converts the unstable intermediate compound to carbon dioxide and ammonia.

5 Claims, No Drawings

METHOD FOR DEGRADING AROMATIC EXPLOSIVE SOLUTIONS

BACKGROUND OF THE INVENTION

The present invention relates to a method for disposing of waste discharges containing aromatic explosives, such as TNT, and more particularly to a method of degrading explosive molecules so that the resulting effluent can be dumped without creating hazard or pollution.

The most common method for disposing of waste discharges containing explosives is to dump them without any treatment. This is undesirable both ecologically and from a safety point of view. Although, the explosive material can be separated from the fluid, which is usually water, by passing the effluent through an activated charcoal or resin column, the filter medium and the explosives absorbed create another disposal method.

SUMMARY OF THE INVENTION

The present invention relates to a method for disposing of waste discharges containing aromatic explosives, such as trinitrotoluene, dinitrotoluene, cyclotetramethylenetetrainitramine, cyclotrimethylenetrinitramine, and mixtures of these explosives. A water solution of explosives is mixed with a small amount of an additive, such as acetone or hydrogen peroxide and this mixture is then subjected to ultraviolet light. The subjecting of the additive to ultraviolet light produces a free radical which then strips off a hydrogen molecule from the other organic molecules present and creates an unstable intermediate product. Further exposure of this unstable intermediate product with ultraviolet light reduces the product to carbon dioxide and ammonia.

It is therefore a general object of the present invention to provide a relatively inexpensive method for disposing of waste discharges containing aromatic explosives.

Another object of the present invention is to provide an ecologically acceptable method of disposing of aqueous solutions of explosives by degrading the explosive molecules.

Other objects, advantages, and novel features of the present invention will become apparent from the following detailed description of the invention.

DESCRIPTION OF THE PREFERRED EMBODIMENT

A water solution of explosives to be treated is placed in a mixing vessel and between 1 and 2 percent of either acetone or hydrogen peroxide is added to the water solution. This mixed solution is then transferred by pump or gravity to an exposure chamber having ultraviolet light. Photodecomposition of both the explosive and the additive takes place.

The method of the present invention has been found effective against trinitrotoluene (TNT), dinitrotoluene (DNT), cyclotetramethylenetetranitramine (HMX), cyclotrimethylenetrinitramine (RDX) and mixtures of these explosives. The photochemical reaction mechanisms are not fully understood but are thought to be as follows:

Acetone Mediated Reaction (1) $CH_3\overset{O}{\overset{\|}{C}}CH_3 + UV\ light \rightarrow 2CH_3\cdot + CO_2$;

(2) $CH_3\cdot + Explosive \rightarrow CH_4 + Unstable\ Intermediate\ Product$;

(3) $Unstable\ Intermediate\ Product + UV\ light \rightarrow CO_2 + NH_3$

Hydrogen Peroxide Mediated Reaction (4) $H_2O_2 + UV\ light \rightarrow 2OH\cdot$;

(5) $OH\cdot + Explosive \rightarrow H_2O + Unstable\ Intermediate\ Product$;

(6) $Unstable\ Intermediate\ Product + UV\ light \rightarrow CO_2 + NH_3$.

In the above equations (2) and (5), the radicals $CH_3\cdot$ and $OH\cdot$ strip off a hydrogen molecule from the explosive compound to produce an unstable intermediate product which, when subjected to ultraviolet light, degrades the unstable intermediate product into carbon dioxide and ammonia.

The following examples are provided to illustrate the invention:

EXAMPLE I

An exposure chamber was constructed and was comprised of a fluorescent light fixture which housed a germicidal lamp which emitted short wavelength ultraviolet light. The lamp was surrounded by a pyrex sleeve which had an inlet port on one end and an outlet port on the opposite end. A water solution of TNT (100 ppm) was placed in a mixing vessel and 1 %, by weight, of acetone was added. This mixture was pumped from the mixing vessel through the pyrex sleeve and then back into the mixing vessel. After 3 hours, all TNT and conversion products were eliminated.

EXAMPLE II

A water solution of TNT (100 ppm) was mixed with 1 % hydrogen peroxide and pumped through the exposure chamber described in EXAMPLE I. After 24 hours, the TNT was eliminated and the total organic carbon was reduced from an initial 36.5 mg/l to 0.6 mg/l.

Although the invention has been described with reference to a particular embodiment, it will be apparent that various pumping and exposure arrangement can be made to practice the invention on a large-scale production basis.

We claim:

1. A method of treating an aqueous solution of aromatic explosives to make said explosives inert comprising, adding to said aqueous solution of aromatic explosives a small amount of an additive selected from the group consisting of acetone and hydrogen peroxide, which said additive when subjected to ultraviolet light produces a free radical which will strip off hydrogen from said aromatic explosive, then subjecting said selected additive to ultraviolet light for a sufficient period of time for said selected additive to strip off hydrogen from said aromatic explosives and produce an unstable intermediate product and then for said ultraviolet light to reduce said unstable intermediate product to carbon dioxide and ammonia.

2. A method of treating an aqueous solution of aromatic explosives to make said explosives inert as set forth in claim 1 wherein said additive is between 1 and 2 percent, by weight, of acetone.

3. A method of treating an aqueous solution of aromatic explosives to make said explosives inert as set forth in claim 2 wherein the mixture of acetone and aqueous solution of aromatic explosives is exposed to ultraviolet light for about three hours.

4. A method of treating an aqueous solution of aromatic explosives to make said explosives inert as set forth in claim 1 wherein said additive is between 1 and 2 percent, by weight, of hydrogen peroxide.

5. A method of treating an aqueous solution of aromatic explosives to make said explosives inert as set forth in claim 4 wherein the mixture of hydrogen peroxide and aqueous solution of aromatic explosives is exposed to ultraviolet light for about 24 hours.

* * * * *